US008725829B2

(12) United States Patent
Wang et al.

(10) Patent No.: US 8,725,829 B2
(45) Date of Patent: *May 13, 2014

(54) METHOD AND SYSTEM FOR IDENTIFYING SOUND SIGNALS

(75) Inventors: Avery Li-Chun Wang, Palo Alto, CA (US); Christopher Jacques Penrose Barton, San Diego, CA (US); Dheeraj Shankar Mukherjee, London (GB); Philip Inghelbrecht, Berkeley, CA (US)

(73) Assignee: Shazam Investments Limited, London (GB)

( * ) Notice: Subject to any disclaimer, the term of this patent is extended or adjusted under 35 U.S.C. 154(b) by 1248 days.

This patent is subject to a terminal disclaimer.

(21) Appl. No.: 10/831,945

(22) Filed: Apr. 26, 2004

(65) Prior Publication Data

US 2004/0199387 A1    Oct. 7, 2004

Related U.S. Application Data

(62) Division of application No. 09/671,571, filed on Sep. 27, 2000, now Pat. No. 7,853,664.

(60) Provisional application No. 60/222,023, filed on Jul. 31, 2000.

(51) Int. Cl.
*G06F 15/16* (2006.01)
*G06F 7/00* (2006.01)
*G06F 17/30* (2006.01)
*G10L 15/00* (2013.01)
*G10L 15/06* (2013.01)

(52) U.S. Cl.
USPC ........... 709/217; 709/231; 707/705; 704/231; 704/236; 704/239; 704/243

(58) Field of Classification Search
USPC ........................................................ 709/217
See application file for complete search history.

(56) References Cited

U.S. PATENT DOCUMENTS 3,919,479 A * 11/1975 Moon et al. .................... 704/237
4,230,990 A    10/1980 Lert, Jr. et al.
(Continued)

FOREIGN PATENT DOCUMENTS

EP        480010 B1    5/1993
EP      0 480 010 B1    9/1996    ............... G10L 5/06
(Continued)

OTHER PUBLICATIONS

Bond, P. "A star is born nationally, seeking stellar CD sales (StarCD is expanding its service nationwide that identifies music being played on the radio)". Hollywood Reporter, Wilkerson Daily Co. Hollywood CA, US. vol. 35 No. 13. Nov. 1999. page 1 XP002939032.

(Continued)

*Primary Examiner* — Azizul Choudhury
(74) *Attorney, Agent, or Firm* — McDonnell Boehnen Hulbert & Berghoff LLP

(57) ABSTRACT

A method and system is described which allows users to identify (pre-recorded) sounds such as music, radio broadcast, commercials, and other audio signals in almost any environment. The audio signal (or sound) must be a recording represented in a database of recordings. The service can quickly identify the signal from just a few seconds of excerption, while tolerating high noise and distortion. Once the signal is identified to the user, the user may perform transactions interactively in real-time or offline using the identification information.

34 Claims, 5 Drawing Sheets

(56) References Cited

U.S. PATENT DOCUMENTS

| | | | |
|---|---|---|---|
| 4,415,767 A | 11/1983 | Gill | |
| 4,450,531 A | 5/1984 | Kenyon et al. | |
| 4,739,398 A | 4/1988 | Thomas et al. | |
| 4,843,562 A | 6/1989 | Kenyon et al. | |
| 4,852,181 A | 7/1989 | Morito | |
| 4,918,730 A | 4/1990 | Schulze | |
| 5,125,024 A | 6/1992 | Gokcen et al. | |
| 5,134,719 A | 7/1992 | Mankovitz | |
| 5,210,820 A | 5/1993 | Kenyon | |
| 5,276,629 A * | 1/1994 | Reynolds | 702/71 |
| 5,379,345 A * | 1/1995 | Greenberg | 455/2.01 |
| 5,400,261 A | 3/1995 | Reynolds | |
| 5,437,050 A | 7/1995 | Lamb et al. | |
| 5,574,962 A | 11/1996 | Fardeau et al. | |
| 5,577,249 A | 11/1996 | Califano | |
| 5,581,658 A | 12/1996 | O'Hagan et al. | |
| 5,581,800 A | 12/1996 | Fardeau et al. | |
| 5,661,787 A | 8/1997 | Pocock | |
| 5,721,827 A | 2/1998 | Logan et al. | |
| 5,787,334 A | 7/1998 | Fardeau et al. | |
| 5,842,162 A | 11/1998 | Fineberg | |
| 5,862,260 A * | 1/1999 | Rhoads | 382/232 |
| 5,918,223 A | 6/1999 | Blum et al. | |
| 5,991,737 A | 11/1999 | Chen | |
| 6,018,724 A | 1/2000 | Arent | |
| 6,121,530 A * | 9/2000 | Sonoda | 84/609 |
| 6,377,995 B2 * | 4/2002 | Agraharam et al. | 709/231 |
| 6,434,520 B1 | 8/2002 | Kanevsky | |
| 6,453,252 B1 * | 9/2002 | Laroche | 702/75 |
| 6,505,160 B1 * | 1/2003 | Levy et al. | 704/270 |
| 6,570,080 B1 | 5/2003 | Hasegawa | |
| 6,578,008 B1 | 6/2003 | Chacker | |
| 6,591,245 B1 | 7/2003 | Klug | |
| 6,714,797 B1 | 3/2004 | Rautila | |
| 6,748,360 B2 | 6/2004 | Pitman | |
| 6,829,368 B2 | 12/2004 | Meyer et al. | |
| 6,834,308 B1 | 12/2004 | Ikezoye | |
| 6,941,275 B1 | 9/2005 | Swierczek | |
| 6,990,453 B2 * | 1/2006 | Wang et al. | 704/270 |
| 7,145,129 B2 | 12/2006 | Schneider et al. | |
| 7,174,293 B2 | 2/2007 | Kenyon et al. | |
| 7,194,752 B1 * | 3/2007 | Kenyon et al. | 725/22 |
| 7,257,536 B1 | 8/2007 | Finley et al. | |
| 7,302,574 B2 | 11/2007 | Conwell et al. | |
| 7,346,512 B2 | 3/2008 | Wang | |
| 7,349,552 B2 | 3/2008 | Levy et al. | |
| 7,359,889 B2 | 4/2008 | Wang | |
| 7,444,353 B1 | 10/2008 | Chen et al. | |
| 7,461,136 B2 | 12/2008 | Rhoads et al. | |
| 7,627,477 B2 | 12/2009 | Wang | |
| 7,853,664 B1 | 12/2010 | Wang et al. | |
| 7,865,368 B2 | 1/2011 | Wang | |

FOREIGN PATENT DOCUMENTS

| | | | | |
|---|---|---|---|---|
| EP | 0 955 592 A2 | 11/1999 | | |
| EP | 0 982 578 A2 | 3/2000 | | G01M 13/02 |
| EP | 982578 A2 | 3/2000 | | |
| JP | 03-291752 | 12/1991 | | |
| JP | 09-138691 | 5/1997 | | |
| JP | 2001-075992 | 3/2001 | | |
| WO | WO 91/17540 A1 | 11/1991 | | G10L 5/06 |
| WO | WO 91/17540 A1 | 11/1991 | | |
| WO | WO 93/07689 A1 | 4/1993 | | H04B 17/00 |
| WO | WO 93/07689 A1 | 4/1993 | | |
| WO | WO 93/22875 A1 | 11/1993 | | |
| WO | WO 93/22875 A1 | 11/1993 | | H04N 7/00 |
| WO | WO 94/00842 A1 | 1/1994 | | G11B 17/22 |
| WO | WO 94/00842 A1 | 1/1994 | | |
| WO | WO 97/33273 A1 | 9/1997 | | G10L 5/06 |
| WO | WO 97/33273 A1 | 9/1997 | | |
| WO | WO 97/40491 A1 | 10/1997 | | G10L 5/06 |
| WO | WO 97/40491 A1 | 10/1997 | | |
| WO | WO 99/48099 A1 | 9/1999 | | |
| WO | WO 99/48099 A1 | 9/1999 | | G11B 23/087 |
| WO | WO 01/04870 | 1/2001 | | |
| WO | WO 01/88900 | 11/2001 | | |
| WO | WO 02/11123 | 2/2002 | | |

OTHER PUBLICATIONS

Rolland, Pierre-Yves, et al. "Musical Content-Based Retrieval: an Overview of the Melodiscov Approach and System". Proceedings of ACM Multimedia 99, Proceedings of ACM Multimedia 1999, Orlando, Fl. USA. pp. 81-84. XP002250746. Oct. 30-Nov. 5, 1999.

Zhu Liu, Qian Huang. "Content based indexing and retrieval-by-example in audio". Multimedia and Expo, 2000. ICME 2000. 2000 IEEE International Conference on New York, NY, USA Jul. 30-Aug. 2, 2000, Piscataway, NJ, USA, IEEE, US Jul. 30, 2000. pp. 877-880. XP010513149.

Foote, Jonathan T. "Content-based retrieval of music and audio". Proceedings of the Spie, Spie, Bellingham, VA, US. vol. 3229. Nov. 3, 1997, pp. 138-147. XP002154737.

Liu, Sharlene A. "Landmark detection for distinctive feature-based speech recognition". Journal of the Acoustical Society of America. American Institute of Physics. New York, NY. US. vol. 100, No. 5. Nov. 1, 1996. pp. 3417-3430. XP000641690.

Tseng, Yuen-Hsien. "Content based retrieval for music collections". Proceedings of SIGIR '99 $22^{nd}$ International Conference on Research and Development in Information Retrieval. Berkeley, CA. Aug. 1999. Annual International ACM-SIGIR Conference on Research and Development in Information Retrieval, New York, NY. ACM Aug. 1999. pp. 176-182. XP000970714.

Beranek, Leo L., "Digital Synthesis of Speech and Music," Dec. 1970, IEEE, vol. 18, Issue 4, pp. 426-433.

Bond, P., A Star is Born Nationally, Seeking Stellar CD Sales (StarCD is expending its service nationwide that identifies music being played on the radio) Hollywood Reporter, Wilkerson Daily Co., Hollywood CA, US, vol. 35, No. 13 Nov. 1999, p. 1, XP002939032.

Bond, Paul, A Star is Born Nationally Seeking Stellar CD Sales, 1999 BPI Communications.

Foote, Jonathan T., "Content-Based Retrieval of Music and Audio," Proceedings of the Spie, Spie, Bellingham, VA, US, vol. 3229, Nov. 3, 1997, pp. 138-147, XP002154737.

Kashino, Kunio and Murase, Hiroshi, "Music Recognition Using Note Transition Context," May 12, 1998, IEEE, pp. 3593-3596.

Liu, Sharlene, A., "Landmark Detection for Distinctive Feature-Based Speech Recognition," Journal of the Acoustical Society of America, American Institute of Physics, New York, NY, US, vol. 100, No. 5, Nov. 1, 1996, pp. 3417-3430, XP000641690.

Office Action for U.S. Appl. No. 09/671,571, filed Sep. 27, 2000, mailed Oct. 31, 2006.

Rolland, Pierre-Yves, et al., "Musical Content-Based Retrieval: An Overview of the Melodiscov Approach and System," Proceedings of ACM Mulimedia 1999, Orlando, FL, USA, pp. 81-84, Oct. 30-Nov. 5, 1999, XP002250746.

Talintyre, John, "The Listening Phone," Jul. 1996, IEEE, vol. 42, Issue 4, pp. 151-154.

Tseng, Yuen-Hsien, "Content Based Retrieval for Music Collections," Proceedings of SIGIR '99 22nd International Conference on Research and Development in Information Retireval., Berkeley, CA, Aug. 1999, Annual International ACM-SIGIR Conference on Research and Development in Information Retrieval, NY, NY, ACM Aug. 1999, pp. 176-182, XP000970714.

Zhu Liu, Qian Huang, "Content Based Indexing and Retrieval-By_ Example in Audio," Multimedia and Expo, 2000, ICME 2000, 2000 IEEE International Conference on New York, NY, USA, Jul. 30-Aug. 2, 2000, Piscataway, NJ, USA, IEEE, US, Jul. 30, 2000, pp. 877-880, XP010513149.

Final Rejection for U.S. Appl. No. 09/671,571, filed Sep. 27, 2000, mailed Apr. 15, 2008.

Final Rejection for U.S. Appl. No. 09/671,571, filed Sep. 27, 2000, mailed May 11, 2007.

Final Rejection for U.S. Appl. No. 09/671,571, filed Sep. 27, 2000, mailed Aug. 2, 2005.

(56) References Cited

OTHER PUBLICATIONS

Office Action for U.S. Appl. No. 09/671,571, filed Sep. 27, 2000, mailed Jan. 21, 2005.
Office Action for U.S. Appl. No. 09/671,571, filed Sep. 27, 2000, mailed May 17, 2006.
Office Action for U.S. Appl. No. 09/671,571, filed Sep. 27, 2000, mailed Jul. 8, 2004.
Office Action for U.S. Appl. No. 09/671,571, filed Sep. 27, 2000, mailed Oct. 5, 2007.
Office Action for U.S. Appl. No. 09/671,571, filed Sep. 27, 2000, mailed Nov. 28, 2008.
U.S. Appl. No. 09/671,571: Non-Final rejection Sep. 1, 2009, 4 pages.
U.S. Appl. No. 09/671,571: Notice of Allowance dated Feb. 19, 2010, 6 pages.
U.S. Appl. No. 09/671,571: Notice of Allowance dated Apr. 29, 2010, 6 pages.
Foote, "An Overview of Audio Information Retrieval", In ACM-Springer Multimedia Systems, vol. 7, No. 1, pp. 1-18, ACM Press/Springer-Vertag, Jan. 1999.
Brown, et al., "Automatic Content-Based Retrieval of Broadcast News" In Proc. ACM Multimedia 95, San Francisco, Nov. 1995, 9 pages.
Manber, "Finding Similar Files in a Large File System" USENIX Winter 1994 Technical Conference Proceedings, San Francisco, California, Jan. 17-21, 1994, Oct. 1993, 11 pages.
Miller et al., "Audio Fingerprinting: Nearest Neighbor Search in High Dimensional Binary Spaces" IEEE Multimedia Signal Processing Workshop 2002, St. Thomas, US Virgin Islands, Dec. 9-11, 2002, 4 pages.
Wold et al., "Content-Based Classification, Search, and Retrieval of Audio" in IEEE Multimedia, Fall 1996, col. 3, No. 3: 27-36.
Yang, "Music Database Retrieval Based on Spectral Similarity" Stanford University Database Group Technical Report 2001-14, submitted Mar. 28, 2001 9 pages.
Final Rejection for U.S. Appl. No. 10/831,945 mailed Dec. 10, 2009.
Office Action for U.S. Appl. No. 10/831,945 mailed Jun. 8, 2009.
Final Rejection for U.S. Appl. No. 10/831,945 mailed Oct. 2, 2008.
Office Action for U.S. Appl. No. 10/831,945 mailed Apr. 1, 2008.
International Search Report prepared by the European Patent Office in PCT/EP01/08709.

* cited by examiner

METHOD AND SYSTEM FOR IDENTIFYING SOUND SIGNALS

CROSS REFERENCE TO RELATED APPLICATION

This application is a divisional application and claims the benefit of priority of U.S. patent application Ser. No. 09/671,571, filed Sep. 27, 2000 now U.S. Pat. No. 7,853,664, entitled "Method And System For Purchasing Pre-Recorded Music," which is herein incorporated by reference, and which claims priority to provisional application No. 60/222,023, filed on Jul. 31, 2000 and to which this application also claims priority.

BACKGROUND OF THE INVENTION

The present invention relates generally to methods and apparatuses for obtaining information about and/or purchasing pre-recorded music, and more particularly to a method and system for obtaining information about and/or purchasing pre-recorded music while listening to the music at any location.

When listening to music, people often want to identify a song currently being played on an audio system, such as a radio, but can identify neither the title nor the artist. The listener may simply be interested in the artist, title, lyrics, genre, or other information about the music. The listener may also be interested in obtaining a copy of the music, i.e., purchasing the music.

Frequently, the radio station announcer does not state the title, recording artist or other information about the song at the moment when the listener is interested in this information. Even if this information was announced, it may have been announced before the song was played and at that time the listener was not interested or was not then tuned to the station. The listener must then wait until hearing the song again and hope that the title and artist are announced at that time.

Even when information about the song is announced and heard, there are situations in which such information cannot easily be retained, such as when a listener is operating in a noisy environment, such as in an automobile, or when a listener does not have pen and paper at the ready. This situation presents problems to radio listeners and potential music purchasers and sellers alike. Market studies have shown that many radio listeners prefer radio stations that always announce the name of every song and artist.

A significant number of radio listeners seeking to buy music at record stores are often unable to remember the name of a song or the recording artist by the time they enter a music store to purchase the music. In fact, the sheer number of music recordings available for purchase in a music store can be so imposing that many novice music purchasers do not venture into such stores to purchase music, despite wishing to purchase music. Music fans would buy more music if they had immediate information about the title of the song and artist as it is being played, such as on the radio or other location remote from typical retailing locations.

Methods exist for automatically identifying music from a high-quality, relatively lengthy recording. For example, companies that monitor radio broadcasts to determine copyright and publishing royalties and to construct listings of current best-selling or most popular recording i.e., "top charts", employ certain techniques for identifying copyrighted songs from the broadcast. However, these methods require a high quality piece or excerpt of the song (referred to as a "sample") and are ineffective on short noisy samples. Usually, these methods require a clear signal that is a direct, high-quality connection to the radio output before it is broadcast to prevent noise from corrupting the sample. Consequently, these methods cannot work in a noisy environment using short samples.

Many times unidentified music is heard when riding in a car (or at another similarly inconvenient location). Moreover, when a listener decides he wishes to know the identity of a particular song being played, it is usually well into the song. Therefore, even if the listener were to begin recording the song at the moment he decides he wishes to know the identity of the song, the sample would be relatively short and possibly noisy depending upon the quality of the audio recording and the recording environment. Certainly, most listeners do not carry high quality recording equipment with them when traveling in a car.

Moreover, even if the listener knows the identity of a song, as time passes the desire to obtain a copy of the song also passes. This is the so-called impulse purchase phenomenon, which is well known to retailers. The impulse purchase phenomenon is particularly strong where the listener has not heard the song before, and thus is unfamiliar with the title and/or recording artist. Unfortunately, there is currently no way for a music seller to take advantage of a potential impulse purchase resulting from a listener hearing a song (for perhaps the first time) in a car or other location that is remote from normal retail locations.

The present invention is therefore also directed to the problem of developing a method and system for both identifying music and/or enabling music retailers to take advantage of impulse purchase phenomena.

SUMMARY OF THE INVENTION

The present invention solves these and other problems through a method and system for providing a user with an ability to interactively engage with a service to trigger one or more of a variety of experiences, transactions or events by capturing a sample of an audio stream to which the user is exposed, and delivering that sample to the service. Such experiences, transactions and events, include purchases by the user, delivery of information from the service to the user, the execution of tasks and instructions by the service on the user's behalf, or other interactions that are responsive to the user's wishes.

Thus, according to one exemplary embodiment of the present invention, a service utilizes a system for identifying songs and music from a relatively short sample and enabling a user to interact with the service to immediately purchase a recording of the identified music remotely. In this embodiment, a user captures a relatively short sample of music being played over a music playing device such as a radio, by placing a call with a mobile telephone using a predetermined telephone number and playing the music into the handset of the telephone. A system at the other end of the telephone identifies the song to the user in real-time (i.e., within the duration of the short call). Employing an interactive voice response unit ("IVR"), the service enables the user to immediately purchase a recording of the identified song. The present invention thus takes advantage of the impulse purchase phenomenon by providing a mechanism that guarantees that the user is at the height of interest in the particular music. Coupled with this mechanism is the capability of the user to purchase the music in a very short transaction to ensure the interest does not fade.

Other exemplary embodiments of the invention provide for pre-authorized purchases of identified songs and the detection of unauthorized use of copyrighted materials.

DETAILED DESCRIPTION

Figure 1:
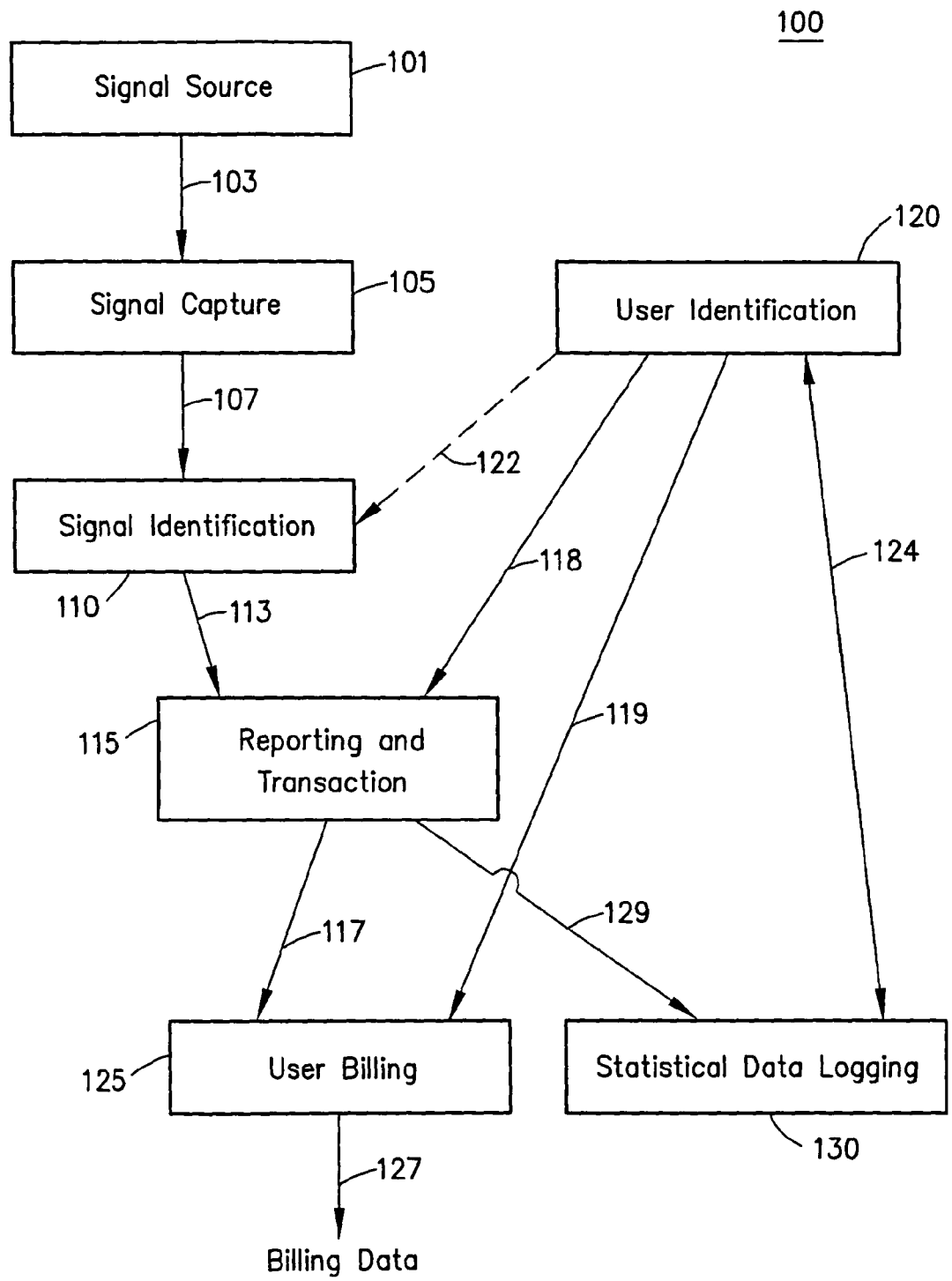
FIG. 1 depicts an operational block diagram of an exemplary embodiment in accordance with one aspect of the present invention.

At this point, it is worthy to note that any reference herein to "one embodiment" or "an embodiment" means that a particular feature, structure, or characteristic described in connection with the embodiment is included in at least one embodiment of the invention. The appearances of the phrase "in one embodiment" in various places herein are not necessarily all referring to the same embodiment.

The present invention includes a method and system for providing a user with an ability to interactively engage with a service to trigger a variety of experiences, transactions, or events by capturing a sample of an audio stream to which the user is exposed and delivering that sample to the service. It is noted that the terms "service" and "service provider" and "system" as used herein include a service, service provider, and system, respectively, which employ the various principles of the present invention unless otherwise indicated.

The audio stream can take any form where a message or information (i.e., content) is available for the user to experience, and may come from many sources, radio and television, pre-recorded audio, signals on internet and computer-based systems, telephones, and even live demonstrations or performances. Using a sampling device, such as an ordinary mobile (or cellular) phone, the user captures a sample of the audio stream and transmits the sample to a service provider employing the present invention.

The service provider may employ the sample by itself, may derive information from the sample, may use data known about the user (e.g., the user's identity and/or user profile), may prompt the user for additional information, or may employ a combination of all such inputs, to trigger an experience, transaction or event that is responsive to the user's needs. As described in more detail in the various embodiments of the invention below, such experiences, transactions and events include purchases of merchandise or services by the user, delivery of information from the service to the user, the execution of tasks and instructions by the service on the user's behalf, and other interactions.

An exemplary embodiment of the present invention provides a method and system for both identifying songs and music from a sample captured and transmitted using a mobile telephone, and providing a listener with an immediate opportunity to purchase the identified music. As mobile telephones are becoming more prevalent in the marketplace, listeners are likely to have access to a mobile telephone when hearing a song they would like to identify.

When desiring to obtain the identity or other information about a song being played, the user (i.e., listener) dials a predetermined telephone number using a mobile telephone (or any other available telephone, including landline, cordless, etc.), and then holds the telephone handset within audible distance of the source of the audio signal. The telephone number may be programmed into the phone by the user, or the number may be preprogrammed into the phone before its sold in some applications of the invention.

A system at the other end of the telephone automatically answers the phone, compares the sample to those music recordings in its database and then identifies the song to the user. Using an IVR (or a live operator and/or a combination of IVR and live operator; all alternatives collectively referred to below as "IVR"), the user is then provided the opportunity to immediately place an order for a recording of the identified music, for example, an album on CD or tape that contains the selected track.

The purchase may be physically fulfilled (i.e., forwarded to the user) in any number of different ways, such as regular mail, express mail, overnight delivery, courier, etc. Alternatively, digital delivery and fulfillment techniques may also be used, including digital downloads to users' PCs, wireless internet devices, hand held personal computers, palm pilots, or mobile telephones.

Other purchase options may also be provided to the user in accordance with other aspect of the present invention. In addition to being able to purchase the identified music, the user may purchase other merchandise (which could be related to the music or not). For example, after purchasing the album containing the identified song, the user may choose to purchase tickets to an upcoming performance by the song's artist or sending flowers to a loved one who shares that "special song".

In another exemplary embodiment of the invention, the user can set up an account with the service where the user is enabled to select in advance to automatically purchase an identified music selection by simply calling a predetermined number. That is, the service treats a call to a dedicated number as an order for the identified music. According to this embodiment, when the user calls the predetermined number, the computer answers the telephone, identifies the user by the phone's ID, and, after the song selection is identified, a sales order is automatically placed. The user's account is then debited, and the selection is forwarded to the user. The selection could even be added to a compilation being created for the user from other similarly identified selections.

For example, the system could keep adding identified songs to a personal compilation until the compilation reaches the limit of the recording media. Once reaching the limit of the recording media, such as a compact disk, the system would issue the media to the user. This system enables recording artists and record companies to receive the proper royalties for their music while enabling listeners to create individual music compilations on any desired media.

On some embodiments of the invention, the service relies upon a profile for the user that is created in advance of the call (but may be updated during a call as described below). A "user profile" may typically include general information about the user such as name, address, preferred method of payment (i.e., credit card pre-authorization), and set dollar limits on purchases. In addition, service-specific information regarding the user may also be included in the profile, such as demographic and user-identified preference information, to facilitate the service tailoring the transaction to fit a particular user. Moreover, with automatic telephone number identification, i.e., "caller ID", profiles can be built without prior user registration.

Age, education, residence, gender, occupation, and personal interests, likes and dislikes, among other criteria, may be employed to most effectively match transaction offers to users' interests and purchase habits. For example, one particular customer of the service may have a user profile that indicates that the user is a member of a demographic group that is music-savvy and aware of music trends. After offering to sell a recording of the song selected by the user, the service could offer to sell a recording by an artist that is "moving up the charts" in popularity. Thus, by employing a user profile in some applications of the invention, a higher transaction closing rate may be realized as offers are more accurately targeted to users who may be predisposed to view the offer favorably. In one embodiment of this aspect of the invention, the system could play a sample of the other recording over the telephone as part of the transaction, thereby ensuring that the user was interested in this recording.

It is noted that user profiles are often dynamic and that the present invention includes an ability to update and change a user profile in response to changes in usage patterns (as described below), market and industry trends, user input, and other factors.

A feature of the invention related to user profile is usage tracking. By tracking the frequency and time of access, the type of music sought to be identified, and purchase history, for example, of a user, the service can gain additional insight into factors which may influence a user. Patterns of usage may be derived which may allow predictive modeling to be utilized, for example, to enhance and refine service offerings. The system of the present invention can thus differentiate between repeat users (who heavily access the service) and casual users (who occasionally or infrequently use the service) and adjust the options, offers, and interactive scripting (as described below) so that interest and enthusiasm is maintained among the service's customers. It is contemplated that the user profile and usage tracking/pattern features described here may be used in other embodiments and applications of the inventions as well.

There is an understanding of the fact that there may be some instances where recognition of an unidentified sound or song is not possible. In some cases this may be due to very short or noisy samples that challenge even the very capable technology platform of the present invention, or more likely, there is not an entry in the service's database that matches the sample even under the best conditions.

While mass storage of a vast library of recorded music and sounds is technically feasible, clearly it is not economical for a service provider to store data corresponding to every song or sound that exists in the world. Moreover, as barriers to publishing come down (through increased use of such distribution channels as the internet), it is expected that the rate at which new music is introduced to the public will continue to increase. As a result, it is expected that the entries to the service's database will always lag the newest (or most obscure) releases.

The present invention contemplates that such unidentifiable samples may be advantageously utilized. Users are afforded the opportunity to "stump" the service, acquaintances, or other users. As evidenced by the popularity of radio programming where the disk jockey plays a small snippet of a song and then rewards the listener who correctly identifies the "mystery" song, many users of the present service are expected to embrace this enjoyable aspect of the invention. Accordingly, in some applications of the invention users may store, retrieve, and forward the captured samples (for example, to other users). A service provider can thus implement contests, games, and promotions using the present invention to implement a modern day "Name that Tune." Such activities may be expected to heighten interest in the service as a whole.

In another aspect of the invention, in addition to having the option of purchasing the identified song, the user may initiate other types of interactive experiences, events, or transactions with the system during a call. Such interactive experiences, events, and transactions may include purchases of merchandise or services, the receipt of information, the storage and manipulation of archived data, and an ability to command the system to perform desired tasks or instructions. Thus, this aspect of the invention provides the user with a common and consistent interface with the service to perform multiple interactive transactions.

For example, through the interactive voice response unit, the user may select from a number of options. An interactive voice response unit advantageously provides accurate and fast interactions between the user and the service and minimizes the amount of intervention by service personnel. Thus, playing a programmed audio script to the user, and receiving DTMF (dual tone multi-frequency or "touch") tones or voice commands from the user, the interactive voice response unit interacts with the user by providing the option to hear a clip of the identified recorded song or hear clips from other songs (e.g., tracks on the same album or from the same artist as the identified song, or music that is determined by the service to be of interest to the caller by a usage pattern or user profile).

The user may be given the option of obtaining more information about the song, artist, or album. Examples of such information include song genre (e.g., folk, rock, R&B, country, rap, etc.) song lyrics, trivia, liner notes, production notes, instrumentation, musician identification, song position in music ranking services, such as Billboard®, and calendar of live appearances by the artist. Service-specific information may also furnished such as the tracks that the service identifies with the greatest frequency to the service subscribers on a given day. For some users, a desire to gain such information may be equal or stronger than the desire to know a song's title and artist.

Data archiving and manipulation may be implemented as another interactive user option. This aspect of the invention provides for the user to save the identification and/or other information on a local storage medium for future access. And, as noted above, users may wish to store the captured samples themselves. A typical voice mailbox system may be utilized to implement such functionality, or alternatively, a web-based interface may be established with user-allocated disk space on a local server. Such access may be gained using the same telephone interface used with song identification, or an alternative platform (i.e., one that is accessed by dialing a different number).

Alternatively, saved data may be accessed and/or manipulated using such interfaces as a web browser with internet access. Such data archiving and manipulation feature of the invention may be used to implement service features that would, for example, allow users to store information on identified tracks and play them back on demand, or allow others to access the stored tracks.

Additionally, users may create their own music compilations and share them with others, using for example, MP3 storage and access protocols. Other information input from a user may also be stored, for example, to annotate a track or compilation with the user's thoughts and comments. Captured samples may be stored and manipulated as well to facilitate contests and games (as described above) or to implement other functions that may require accessing the "raw" sample.

Another aspect of the user and service interaction provided by the present invention includes an ability of the service to implement tasks and instructions directed by the user. One notable example of this feature includes the connection of a live operator (i.e., customer service personnel) to the user upon command. This feature additionally allows a user to interact with others users, non-users, or potential users of the service, or a user may interact with other systems.

For example, the user may instruct the service to send a recommendation for the identified song to a friend via email or SMS or a clip of the song to the friend's mobile telephone or service-sponsored storage site (e.g., voice mailbox or allocated disk space). The user could also instruct the service to ship a recording by a featured artist, or other merchandise (both music-related and non-music-related merchandise), as a gift. Games, contests, and promotional events involving interactive user participation may also be readily implemented using this inventive feature.

In addition, the service, acting as a portal or gateway or referring agent, may also provide the user with access to other systems, information, and services hosted or provided by third parties.

Such interactive experiences may include the delivery of advertising or promotional messages to the user from the system. Such advertising may be general or targeted to a user based on a user profile. A user may also be directed (for example, via call forwarding, or via web link) to fulfillment partners of the service provider to either fulfill a purchase request or user-driven instruction in instances where such partners are used. Alternatively, direct links to fulfillment partners, advertisers, and other systems may be provided as an option to a user in themselves.

In addition to the interaction that is implemented between the user and system during a call, the user may also be directed to other sources of information that are external to the system, for example, internet websites. Such websites may host content that is specifically related to the identified song, other music, or other topics of more general interest. The website may be configured to provide similar or additional interactive experiences to the user.

In another exemplary embodiment of the invention, a user experiencing a multimedia presentation, including an audio track, may capture and transmit a sample of content in the show to the service to indicate an interest in a product or service that may be featured.

For example, a user may capture an audio sample of a commercial advertisement for a particular product or service from a broadcast TV presentation. Upon receipt and identification of the product or service from the captured sample, the service may provide a purchase option to the user, furnish more detailed product or service information, or other provide other optional interactions as described above.

Fulfillment of the desired transaction to the user can be accomplished by the service directly, or through fulfillment partners as appropriate. This embodiment may be particularly beneficial when the advertiser does not include ordering or retail location information in the content of the advertisement. For example, a local retailer may not be known to the advertiser or it may be impractical for the advertiser to identify such retailers during the course of the advertisement (as in cases where the advertisement is distributed over a broad geographic region). Or, the advertiser may not equipped with all the necessary facilities (such as an IVR) to receive direct orders from consumers.

Thus, this embodiment of the invention provides a benefit to both user and advertiser alike. For the user, the service implements a desired transaction that would be more difficult and less convenient if the user employed conventional means to achieve the same end. And, by locating and identifying users who are ready to purchase to advertisers, the service can increase product deliveries by acting as a referral agent (by establishing a path of communication between the user/consumer and advertiser), or by acting as a "virtual" IVR for the advertiser (where the service provides the customer service interface between the user/consumer and the advertiser, and the advertiser acts as a defacto fulfillment partner of the service).

The principles of this embodiment may also be readily applied to paid television programming (i.e., "infomercials") and home shopping broadcasts. In the case of paid television programming, product information segments are typically interspersed with segments that provide ordering information (during such segments, a viewer is generally provided product pricing information and directed to a toll-free telephone number to place an order with a live customer service representative). The content recognition technology employed by the present invention allows for faster, more accurate, purchases on impulse (even at times during the presentation when the toll-free number is not displayed) and provides an alternative ordering path to the 800 IVR.

In addition, in cases where higher valued products are featured that normally require more deliberation before purchase decisions are made, users may desire more information to assist in their decision making but often be reluctant to interact with a live representative to obtain it (i.e., the user is not ready to buy and wishes to avoid being pressured into buying). By contrast, user/consumers employing the present common user interface feature would be comfortable in knowing that such additional information could be readily obtained without human contact as the interface is seamless and consistent across all experiences, events and transactions in accordance with the invention.

In the case of home shopping broadcasts, ordering information is generally displayed at all times during the broadcast. Consumers typically place orders via toll-free IVRs by identifying item numbers, color, size and other identification information for the products desired for purchase to the home shopping service. While such methods are satisfactory, use of the present invention can enhance the home shopping experience for many users through its interactive interface that facilitates the exchange of ordering information using the common user interface feature described above.

In another exemplary embodiment of the present invention, the unauthorized use of copyrighted material may be detected. Recognition of copyrighted material without embedded watermarks is also provided. This aspect of the present invention enables an operator of a server to sample music recordings being transmitted over its server to ascertain whether the users are violating copyright laws. By identifying copyright violations at the server level, a web site operator can potentially avoid being accused of facilitating copyright infringement.

Other techniques for obtaining the music sample may be employed due to the ability of the algorithm utilized in the present invention to process a relatively short sample and generate a positive identification in the presence of relatively large amounts of noise (both background noise in the user's environment and noise resulting from signal compression and/or impairments along the signal transmission path).

For example, the music sample can be captured and sent to the system using many real-time sampling techniques. Thus, in various embodiments of the invention, a user may capture and transmit a sample using, for example, a standard (i.e., wired) telephone, internet-streaming socket, or voice-over-IP transceiver. In other embodiments, a sample may be first recorded and then later transmitted to the system for identification, using for example, tape recording, CD writing, answering machine, digital voice recorder, uploaded WAV file, and the like.

Thus, users of the present inventive system can employ telephony or data communications devices including ordinary or mobile telephones, PCs, internet access devices, wireless internet devices, personal data assistants ("PDAs"), wireless information devices, two-way pagers, and other devices that are equipped with an ability to capture a media sample in accordance with the principles of the present invention.

The present invention provides tremendous advantages to users to facilitate the identification of songs anywhere and anytime. The identification occurs on a real-time basis, that is, the user can expect the information to be provided within the duration of a short transaction with (the service such as a one minute telephone call). The user does not need to wait to receive the desired information at a later time. The user simply and easily accesses an interactive voice response unit, dial up data interface or website, allows the microphone on the phone or PC to capture the music being played or performed anywhere for a few seconds, and, within seconds, learns the name of the song and the artist, as well as a range of additional information upon request. Users can then instantly purchase the music (in multiple formats), or save the information and access it later on a personalized web site (which may be configured, for example, to provide "personalized radio," i.e., content aggregation according to the user's taste, using streaming audio), or perform several other actions from their telephone, internet access device, personal digital assistant (PDA), or PC.

By providing for real-time identification of songs being played or performed anywhere, the present invention solves the problems identified above and provides significant advantages for both buyers and sellers of music. First, music buyers employing the present invention are provided with the song and artist information that they wish to know, as well as the ability to purchase a song or an entire album as soon as they hear it, i.e., at the peak of their interest in the song. Second, sellers of music, including record companies and retailers, will benefit from heightened impulse purchases, as customers are able to recognize and remember songs they hear.

Furthermore, the present invention facilitates the creation of a rich customer information database that may be used to fine tune marketing campaigns by radio station and record companies and retailers, such as promotions and targeted marketing. Such data may be useful for the music industry to learn valuable new insights on customers' music preferences. The reactions of the users of this service to new music will provide valuable predictive information to recording labels and musicians attempting to market their recordings. Thus, the present invention provides for the first time a direct connection to the heartbeat of the music consumers for music retailers, record companies and radio stations.

The present invention provides a service operator with a multitude of revenue opportunities. The immediate purchase opportunity for the user afforded by the invention could allow music sellers to provide monetary and other incentives to the service provider so that the identification service is offered free of charge or at subsidized rate (i.e., a rate that may be less than the cost of providing the service). Alternatively, the service could obtain revenue from the price of the telephone call, e.g., similar to 900 toll call telephone service, in which the user pays a toll set by the 900 number system operator above and beyond the normal toll fee for placing the call.

The service may also share in the increased revenue realized by telephone companies and internet service providers ("ISPs") as users increase their usage of access facilities to use the service. In addition, subscription arrangements with users may be established and revenue received for the service's delivery of advertising and promotional materials to the user. Revenue may also be realized through merchandise retailing and fees collected from fulfillment partners. Revenue may also be realized by selling information or advertising to companies by leveraging the user-specific knowledge acquired through use of the service.

The present invention employs an audio pattern-recognition technology that can be used to recognize a sound signal within a short noisy and distorted audio sample, which technology includes a robust recognition engine that is context free, convenient, fast, and noise immune. The audio pattern recognition technology is robust in that it works with highly distorted and noisy signals. In contrast, current music recognition engines require high-quality signals. The audio pattern technology is context free in that it does not rely on the knowledge of the source of the broadcasting. Prerecorded sounds can be recognized in circumstances where the source is unknown (for examples in bars and restaurants, on the street, in cars, airplanes, public transportation, etc.). The audio pattern technology is convenient in that excerpts of only a few seconds from any unique portion of the entire song rendition are sufficient to enable recognition. Other techniques require comparatively long samples of the music to positively identify it. The audio pattern technology of the present invention is fast because it uses an algorithm that can search a very large database in a very short period of time.

The present invention overcomes the shortcomings suffered by various other known arrangements that attempt to solve the song identification problems mentioned above. One such arrangement identifies information (i.e., songs and commercials) broadcast by certain major radio systems by relying on a third-party identification service and the manual input by the user of data specifying the source of the broadcast information.

Another known arrangement requires users to carry a keychain, which can timestamp the moment a song is played on the radio, and later enable purchases when the device is synchronized with an internet-connected computer. Users of such arrangements suffer an undesirable delay before learning the identity of the song, thereby diminishing the power of the impulse purchase phenomenon. In addition to the delay limitations, both above-described arrangements can only identify songs aired on radio stations.

Other music recognition arrangements have avoided attempting to perform music identification directly. Instead, they rely on contextual information, such as a timestamp plus radio station in order to look up a playlist provided by a third-party source. Such third-party information must be gathered using playlists submitted by radio stations, causing dependencies on business relationships, reducing radio station participation, or problems when the Disc Jockey changes the actual song played at the last minute. Users of certain such arrangements are limited to only the radio stations with which they have registered. Alternatively, third-party playlist information can also be provided by a music tracking services, but such services usually only track radio broadcasts for the largest radio stations in major metropolitan areas.

Another limitation with these known music recognition arrangements is that they cannot be used in the conditions under which present invention operates with the same effectiveness. Current recognition technologies do not lend themselves to robust recognition as they fail under less than ideal conditions such as those encountered due to noise, dropouts, interference, bandlimiting, and voice-quality digital compression. Signals that are transmitted through additional mediums that are subject to linear and nonlinear distortion cause search methods that rely on cross-correlation or statistical moments to fail. Additionally, the arrangement of the present invention can recognize the music with as little as 5 to 15 seconds of sampling time, depending on the signal quality and size of the database, potentially allowing recognition and purchasing transactions to be carried out within a one-minute telephone call.

Other known music recognition arrangements embed a perceptually inaudible watermark or other side-channel information to identify the music. To take advantage of such embedded information the user must have a special decoding device, perhaps built into the receiver, to obtain the information. Using a telephone, or a computer with a web browser, it is possible to obtain play information from the radio station. But this requires the user to know which station he or she is listening to, as well as how to contact the station. By comparison, the method and system of the present invention is context-free, requiring only that the user submit the sampled music information directly for identification. No watermarks, side information, special devices, or knowledge of radio station contact information are necessary.

Referring now to FIG. 1, there is shown an operational block diagram of an exemplary embodiment 100 according to one aspect of the present invention. A signal source 101 in the environment generates a signal 103 that is captured by signal capture block 105 and transmitted to signal identification block 110 on line 107. Signal identification block 110 is described in greater detail below. Signal identification block 110 identifies the signal 103 from signal source 101 and passes the identification information (i.e., song ID) to reporting and transaction block 115 via line 113. User identification block 120 additionally provides the identity of the user (not shown) to the reporting and transaction block 115 on line 118, whereby the user may be informed as to the identity of the signal as described more fully in the text accompanying FIGS. 3A and 3B below.

In some applications of the invention, as discussed further below, it may be preferable to have user identification block 120 operationally coupled to, or alternatively incorporate, a user database where user data (and data related to other user options), among other features, may be read from and written to (not shown in FIG. 1). The user may optionally carry out transactions regarding this signal identity as described in greater detail below and in Appendix 1. Billing data from user billing block 125 on line 127 may be used to generate a bill to the user commensurate with the extent of the usage of the signal identification service aspect of the invention as described herein. Additionally, statistics regarding the signal identification, signal identified, and/or the user's usage of the service may be logged by statistical data logger 130. Such data is of interest in market research, and has economic value. In such embodiments of the invention, user identification information is passed from user identification block 120 to statistical data logger 130 on line 124 as shown in FIG. 1 and reporting and transaction data from reporting and transaction block 115 is passed via line 129. In some applications of the invention it may be desirable for statistical data logged by logger 130 to be fed to user identification block 120, via line 124, for example to facilitate the update of user identification information.

The signal 103 generated by signal source 101 in FIG. 1 may be any kind of signal in the environment that is a rendition of a signal indexed in a database within the signal identification block 110. Examples of signal 103 include recorded music, radio broadcast programs, advertisements, and other such signals of interest. Accordingly, the signal may be in the form of acoustical waves, radio waves, digital audio PCM stream, compressed digital audio stream (such as Dolby Digital or MP3), internet streaming broadcast, or any other such manner of transmitting such pre-recorded material. Furthermore, signal 103 may be degraded as a result of background noise (such as that encountered while in a moving car), talking voices, transmission errors and impairments, interference, time warping, compression, quantization, filtering, or other such distortions of the original.

Signal capture block 105 captures a sample of signal 103 and provides it in a format suitable for processing by the signal identification block 110. Illustrative embodiments of signal capture 105 devices include, but are not limited to, microphone, telephone, mobile telephone, tape recorder, digital voice recorder, answering machine, radio receiver, walkie-talkie, internet streaming socket, voice-over-IP transceiver, or other such signal capturing device. Typically then, the signal capture device is incorporated into a device that the user employs in a location remote from the service. Conventional devices like mobile and regular telephones, PCs, radios, and other recording and communication devices that users already own or use everyday for other purposes may conveniently be used, without modification, to practice the present invention. Upon capture of a sample of signal 103, signal capture block 105 delivers the sample to the system via line 107, as indicated.

User identification block 120 identifies the user to the song recognition arrangement of the present invention, and may optionally be operationally coupled to the signal identification block 110 via line 122. Examples of devices which generate the appropriate identification for use with user identification block 120 may include caller ID on a POTS (Plain Old Telephone Service) line or a mobile telephone, internet IP address of a terminal sending in the captured signal, or a cookie file stored on an internet browser on the user's terminal. In such implementations, the user's signal capture block 105 stores a user ID and identifies the user to the arrangement 100. In another illustrative example of user identification block 120, the user may be required to enter an account code, for example by keying it in on a touchtone pad on a telephone or saying a pass phrase while signing on to a service incorporating the principles of the present invention if dialing in. Alternatively, the user may be identified by inserting an object carrying identification codes into a terminal. Examples of this include a credit card, ATM card, or Dallas Semiconductor Java Ring. The user may also be identified by a biometric device to scan fingerprints, retinae, palm print, or other such physical characteristics of the user. A speaker identification system to identify the user by vocal characteristics is another alternative method. User identification block 120 is an optional component of the present arrangement, which is employed if billing and tracking of user activity is desired.

Figure 4:
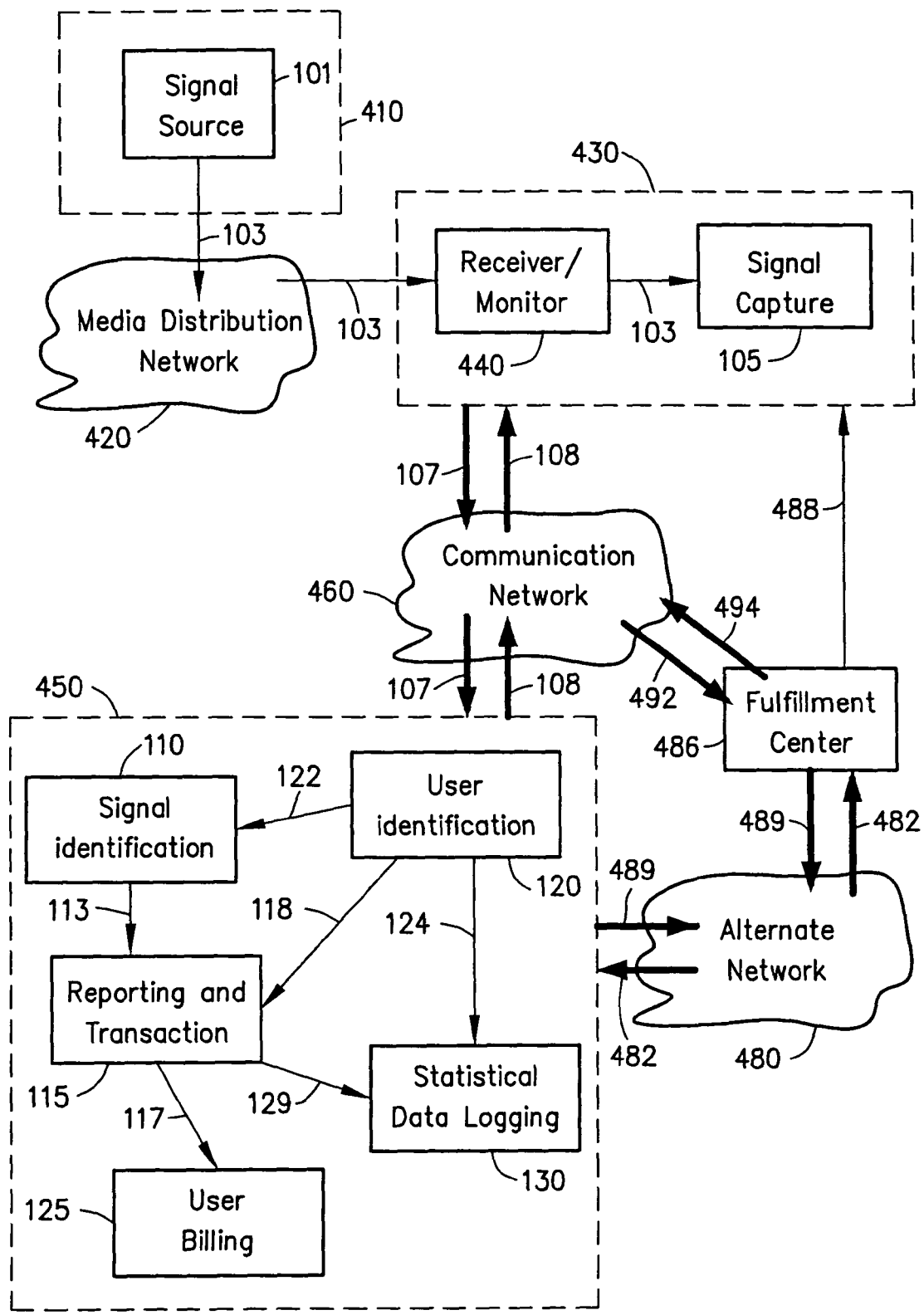
FIG. 4 depicts an operational block diagram of an interaction between a user and interactive voice response unit in accordance with yet another aspect of the present invention.

As shown in FIG. 4, the elements shown and described in FIG. 1 are typically associated with entities that are independent of one another. Signal source 101 is typically associated with a media operator or content provider such as radio or television broadcasters, CATV provider, internet service providers, private network or LAN operators, and the like. It is important to emphasize that the present invention contemplates that the signal source may comprise a live demonstration or performance, taking place for example, at a nightclub, bar, or discotheque. Signal capture block 105 is associated with users, however, such association may be merely temporary, as public access devices (e.g., public telephones and internet access facilities) may be readily used, without modification, in order to realize the benefits provided by the present invention. Signal capture block 105 represents features and functionalities that, for example, are implemented by the microphone and associated transceiver circuits in a user's mobile telephone.

The remaining elements of FIG. 1, are collectively associated as indicated in FIG. 4 with a service provider. Signal identification block 110, user identification block 120, reporting and transaction block 115, user billing block 125 and statistical data logger 130 represent features and functionalities of an integrated system that form key elements of a IVR arrangement that may be particularly useful in some applications of the invention. In such IVR arrangements, these collected elements are typically implemented in a system formed by one or more CPUs. The IVR is identified by reference numeral 450 in FIG. 4.

As depicted in FIG. 4, a media provider 410 utilizes signal source 101 which transmits signal 103 via media distribution network 420 which may be arranged from network and transmission elements or other channelized distribution arrangements (as for example, with copper or fiber networks for data or telephony services) or a free space/transmitter infrastructure array (as for example with radio and television broadcasts, satellite systems, and cellular/PCS/GSM wireless telephone services or networks which operate according to short-range wireless protocols such as the Bluetooth™ wireless standard). Receiver/monitor 440 is employed by user 430 to receive signal 103 and transform the signal into a format that facilitates signal 103 to be monitored by the user. Receiver/monitor 440 may be a radio, television, PC, Hi-fi (i.e., stereo) with speakers or any other device that may be used to create a media experience (including audio and video) that may be monitored by the user. User 430 employing the functionalities of signal capture block 105, for example using a mobile telephone, obtains a sample of signal 103 played on receiver/monitor 440, where the sample includes media content of interest selected by the user, such as a portion of an unidentified song. Thus, as shown in FIG. 4, receiver/monitor 440 both outputs a rendition of signal 103 to signal capture block 105 and allows the user 430 to monitor signal 103. However, it is noted that signal capture block 105 may capture a sample of signal 103 via a direct connection to media distribution network 420 (i.e., not relying on receiver/monitor 440 or similar device for signal input). In such instances, the user monitoring of signal 103 is accomplished through other means or user monitoring is not performed.

The captured sample of signal 103 is relayed by the user 430 to the IVR 450, as shown, via communication network 460 on line 107, as shown. Communication network 460 may have a similar arrangement as distribution network 420, or may be unitary with distribution network 420. It should be noted, however, that in certain applications of the invention distribution network 420 may typically be characterized by unidirectional signal propagation (as in the case with broadcast radio and television or typical CATV headend systems) while communication network 460 may typically be characterized by bidirectional signal propagation (as in the case with the public switched telephone network and wireless or wired voice, data, and internet systems). Such bidirectional nature of communication network 460 is indicated by signal flow lines 107 and 108 as depicted in FIG. 4.

In accordance with the invention, the IVR 450 derives information or characteristics of sample of signal 103 including the identification of content contained therein (for example, the song ID). Such derived information may be returned to the user 430 from the IVR 450 using the same communication network 460 or other networks. The signal return path is indicated with lines 108 in FIG. 4. And, as described above, the IVR may interact with the user and other entities. For illustrative purposes, such interaction pathways are depicted in FIG. 4 as lines 489 and 482, input and output, respectively, via alternate network 480. Alternate network 480 may be a network of any type, however, in some applications of the invention it may be advantageous to employ private networks, dedicated lines, or other high-capacity transmission methods should high-bandwidth interactions be desired. Such bandwidth intensive interactions could occur, for example, between the service IVR and fulfillment partners such as record distributors. This communication path is shown in FIG. 4 where fulfillment center 486 interacts with IVR 450 using alternate network 480 and fulfills user purchase orders as indicated by line 488. Fulfillment center 486 may also interact with IVR 450 using communication network 460 over interaction pathways 492 and 494 as indicated.

Thus, FIG. 4 may serve to additionally highlight the principles applied in the exemplary embodiment of the invention described in the Summary. A radio station (media provider 410) employing signal source 101 broadcasts a song (signal 103) over the air (media distribution network 420), which is received on a radio (receiver/monitor 440) of user 430. The song, which is unknown to user 430, is of interest. User 430 places a mobile telephone call over a wireless network (communication network 460) to the IVR 450. The user 430 positions the microphone of his wireless telephone (signal capture device 105) to capture a sample of the music being played on the radio. The IVR 450 receives the sample over the wireless network and derives the identity of the song. Optionally, the identity of the user may be derived from the user's mobile telephone number that is sent from the communication network 460 to the IVR 450 (and user identification block 120, in particular) typically during call set up. The song identification is returned to back to the user's mobile telephone over the same network. Further interactions between the user 430 and the IVR 450 may occur, and if the user chooses to purchase a recording of the now-identified song, the IVR can send the purchase information to the service's distribution facility (fulfillment center 486) via data or voice communication using its local area PC network (alternate network 480) or via data or voice communication over communication network 460 as discussed above. The distribution center sends the selection to the user via overnight courier service (line 488). Similarly, alternate network 480 may be utilized to send an confirming email of the song identification and purchase, if applicable, to the user's email account as described in greater detail above.

Figure 2:
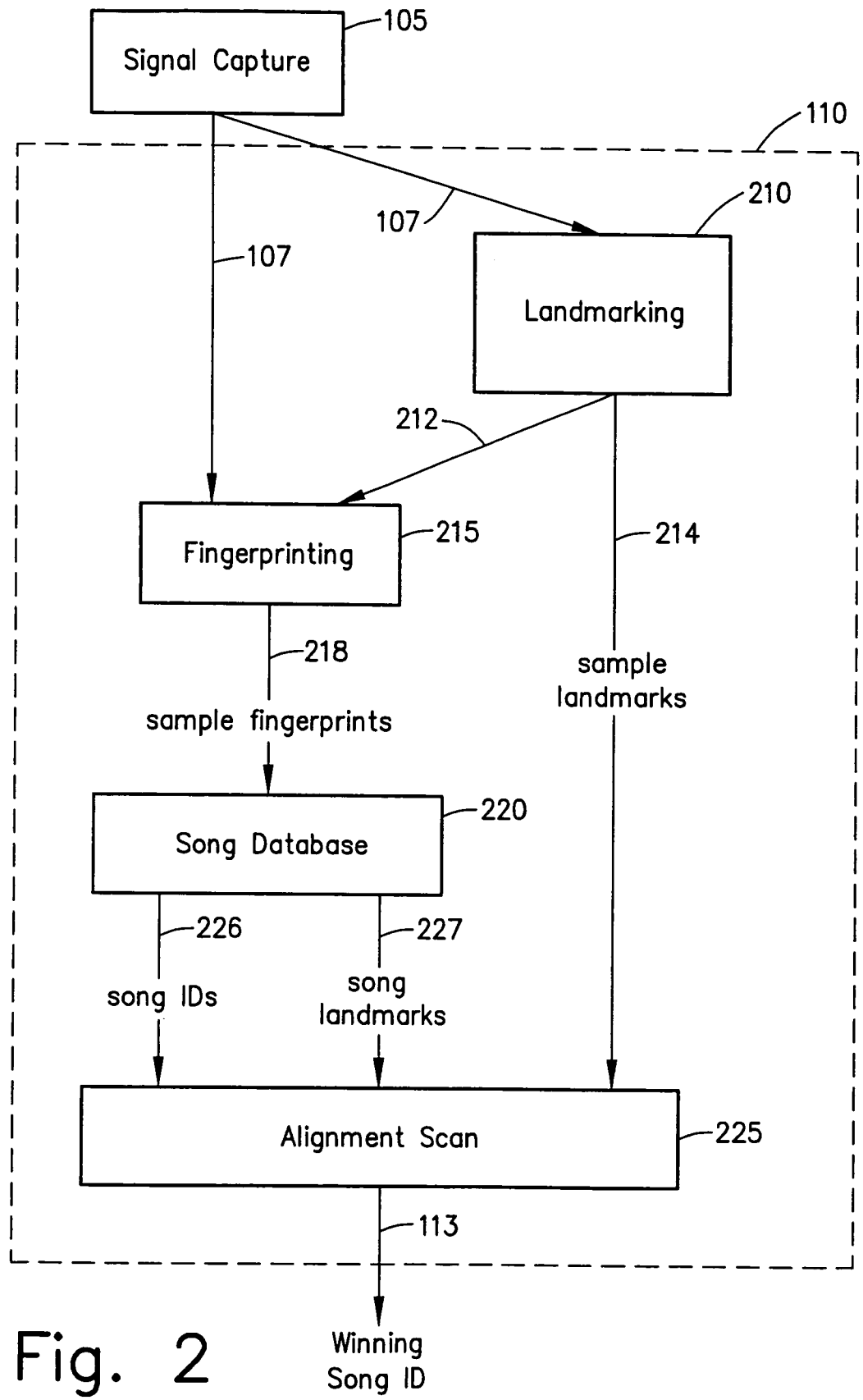
FIG. 2 depicts an operational block diagram of details of the signal identification block in FIG. 1 in accordance with another aspect of the present invention.

Signal identification block 110 (FIG. 1) is described in detail in Appendix 1. In summary, and referring to FIG. 2, the main modules in signal identification block 110 are the landmarking block 210, fingerprinting block 215, song database block 220, and alignment scan block 225. Landmarking block 210 receives the incoming captured sample signal via line 107, as described above, and computes sample landmark time points. This information is passed, as indicated in FIG. 2, to fingerprinting block 215 via line 212, as well as the alignment scan block 225 on line 214. Fingerprinting block 215 computes fingerprints from the captured sample signal at the landmarked time points, generating sample fingerprints. The sample fingerprints are output to song database 220 on line 218 and are used to retrieve sets of matching song fingerprints stored in song database 220, these matching song fingerprints being associated with song landmark and song ID values. The set of retrieved song ID and song landmark values are relayed to the alignment scan block 225, on lines 226 and 227, respectively, along with the associated sample landmark values on line 214 as indicated. Alignment scan block 225 sorts out sets of sample landmark and song landmark pairs, grouped by common song ID. Each set is scanned for linear correspondences in the pairs of landmarks and scored according to best fit. The song ID of the set with the highest score is the winning song ID which is output from alignment scan 225 on line 113. In an illustrative embodiment of the invention, the components forming signal identification block 110 are clustered together in a single computer system, such as an Intel-based PC or other workstation. In another illustrative embodiment of the invention, a networked cluster of CPUs may be used, with different software modules distributed among different processors in order to distribute the computational load. It may be preferable, in some applications of the invention, to use a cluster of Linux-based processors connected by a multi-processing bus architecture or a networking protocol such as the Beowulf cluster computing protocol, or a mixture of the two. In such an arrangement, song database block 220 is stored in RAM on at least one node in the cluster, ensuring that fingerprint searching occurs very rapidly. It is noted that some computational nodes corresponding to the other functional blocks of signal identification block 110, such as landmarking 210, fingerprinting 215, and alignment scan 225 may not require as much bulk RAM as the nodes supporting song database 220. The number of computational nodes assigned to each module may thus be scaled according to need so that no single module becomes a bottleneck. The computational network is thus, advantageously, highly parallelizable and can additionally process multiple simultaneous signal identification queries, where such queries are distributed among available computational resources.

In an illustrative embodiment of the invention, some of the functional modules may be less tightly coupled together than to the other modules. For example, the landmarking and fingerprinting functions of blocks 210 and 215 of FIG. 2 may reside in a physically separate location from the rest of the computational devices shown. One such example of physical separation would be realized if the landmarking and fingerprinting functional blocks 210 and 212, respectively, are more tightly associated with the signal capture block 105. In such arrangement, the landmarking and fingerprinting functions described above are realized and incorporated as additional hardware or software embedded in a mobile telephone, WAP browser, or other remote terminal, such as the client-end of an audio search engine. In an internet-based audio search service, such as a content identification service, the landmarking and fingerprinting functions may be incorporated into the browser application as a linked set of software instructions, or as a software plug-in module, such as a Microsoft DLL. In such embodiments employing loosely coupled functional modules, the combined signal capturing/landmarking/fingerprinting functional blocks shown in FIG. 2 form the client end of the service and send a feature-extracted summary of the captured signal, comprised of sample landmark/fingerprint pairs, to the server end (e.g., song database 220 in FIG. 2). Sending this feature-extracted summary to the server instead of the raw captured audio is advantageous since the amount of data is greatly reduced, often by a factor of 100 or more. Such feature-extracted summary could be sent in real-time over a low-bandwidth side channel along with, or instead of, an audio stream transmitted to the server.

Figure 3A:
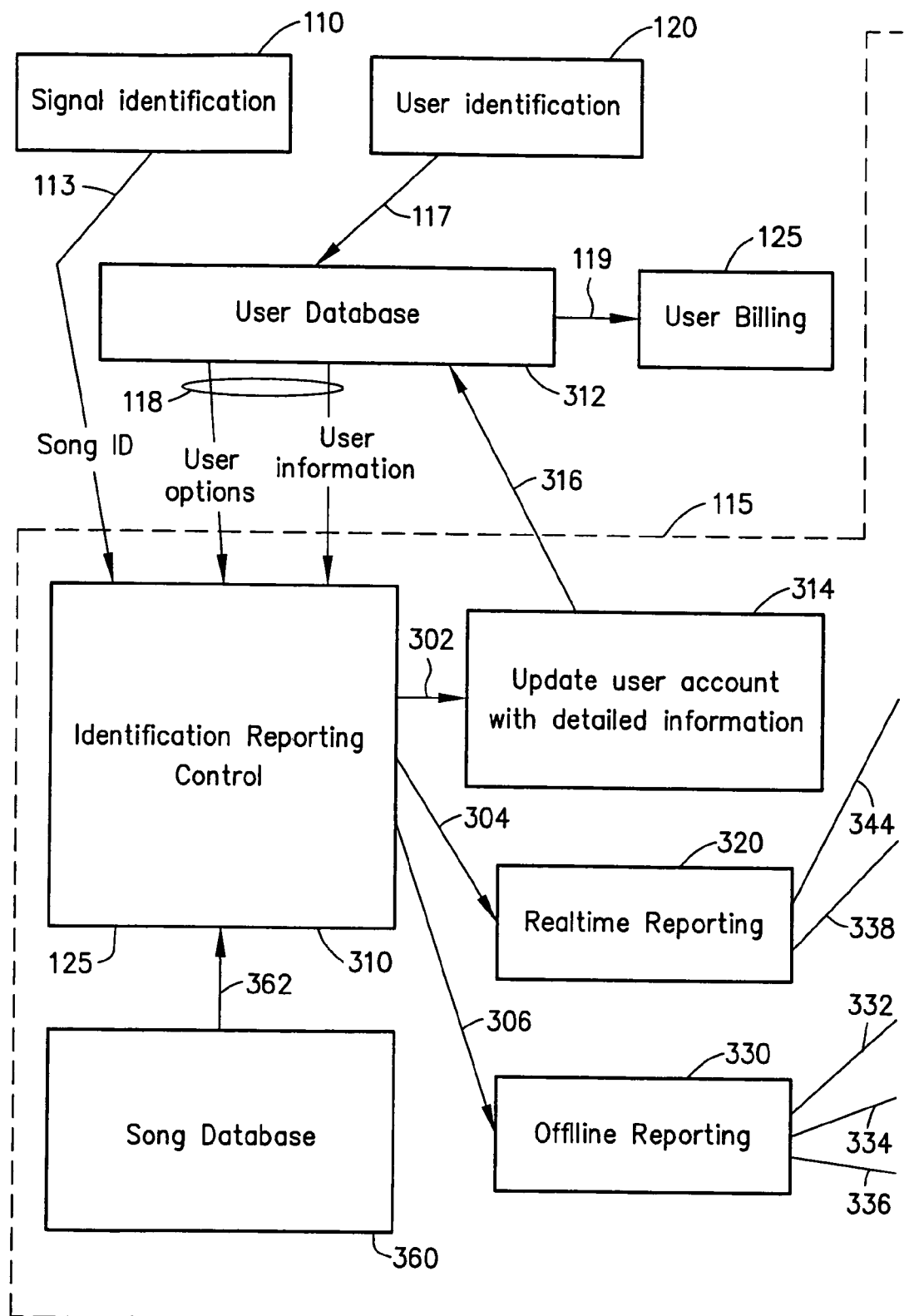
FIGS. 3A and 3B depict an operational block diagram of details of the reporting and transaction block in FIG. 1 in accordance with yet another aspect of the present invention.
Figure 3B:
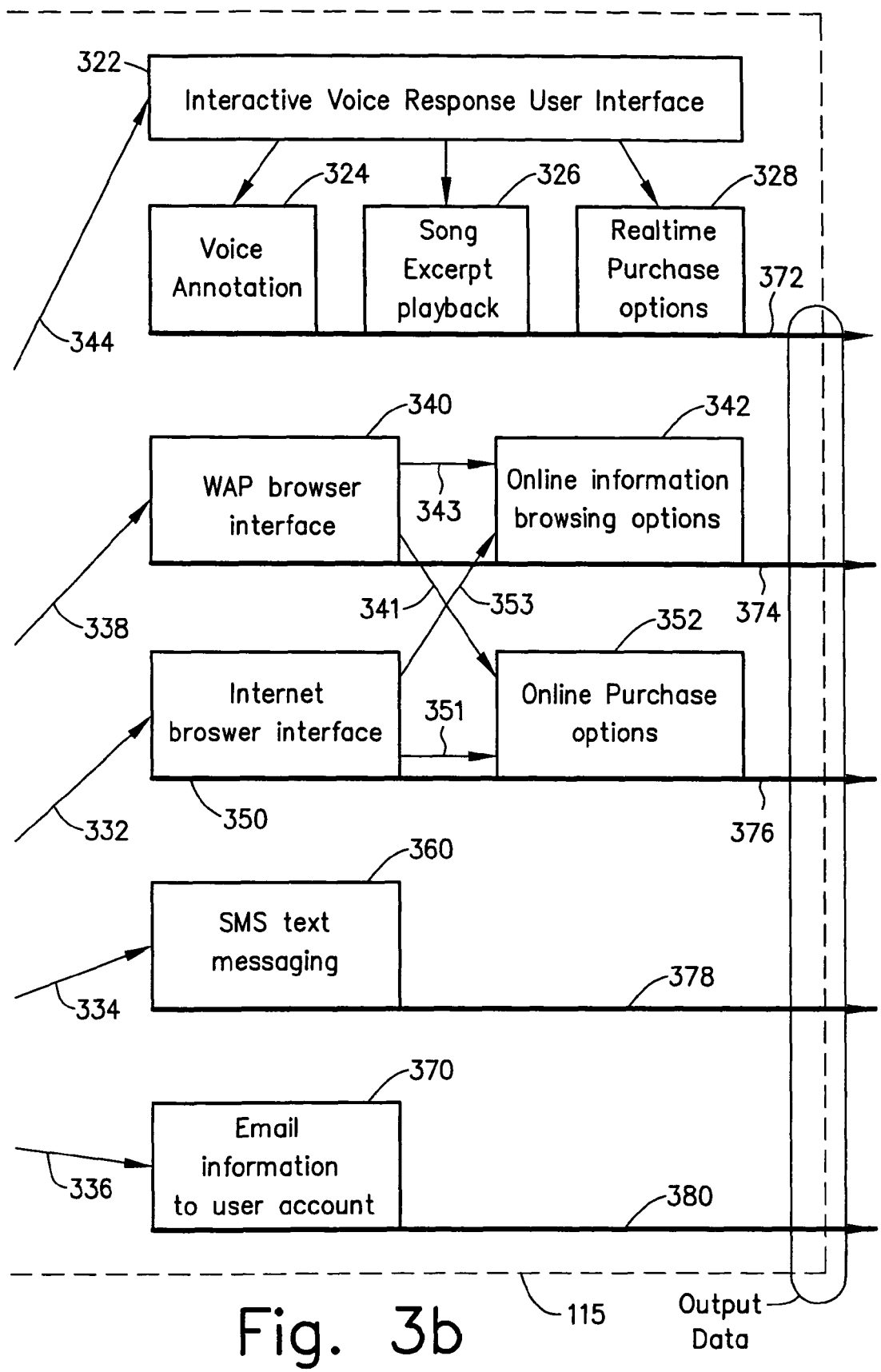

FIGS. 3A and 3B show details of the identification reporting and transactional aspects of the present invention embodied in reporting and transaction block 115 (FIG. 1) and illustrates the highly integrated response mechanism to the user (i.e., a machine or person) who requested the signal identification. As indicated in FIGS. 3A and 3B, identification-reporting control block 310 of reporting and transaction block 115 receives the identification information (i.e., song ID) from signal identification block 110 via line 113. Identification and reporting control block 310 also receives user data, illustrative user options and user information signals (collectively indicated as lines 118 in FIGS. 3A and 3B) from user identification block 120 via user database 312 and line 117 as indicated.

User database 312 is optionally utilized to store detailed user information and may facilitate the user billing function as described above. Functional block 314 is interposed between user database 312 and identification reporting control block 310, as shown in FIGS. 3A and 3B, to implement data updates to the user database (e.g., the user account) on line 316 with such detailed information as a function of the input signals 113, 117, and 118, to identification reporting control block 310 and under the control of identification reporting control block 310 via control line 302. Thus, user database block 312 operates in a read/write manner. It will be appreciated that user database block 312 may be particularly beneficial in some applications. Any time a user captures a signal for identification, the service can leverage existing, and capture new, data and statistical rules. First, the service can log the signal identification for the user account, and every subsequent continued interaction with the service. Second, the service can use existing data about the user account to enhance the experience. This will create a highly personalized experience, whether it be custom user account settings and/or preferences, a personalized user website, or targeted advertising.

Referring again to FIGS. 3A and 3B, identification reporting control block 310 is operationally coupled via lines 304 and 306 to real-time reporting block 320 and offline reporting block 330. The user interaction with the arrangement of the present invention may be in real-time or delayed. Real-time reporting provides an instant response about the identified signal to the user. This real-time response may be in the form of data or voice. Voice annotation means that the user learns about the identified signal by listening to a voice report. After receiving the voice report from voice annotation block 324, the user may be provided with additional options for further interaction, such as playback of the signal captured and purchase opportunities of the content identified (i.e., the user may place an order to purchase the song or album that was just identified). This interaction is characterized by being voice prompted, in that interactive voice response user interface block 322, functionally coupled via line 344 to identification reporting control block 310 through real-time reporting block 320 reads out the alternatives, asking the user to respond. The user provides such responses to the voice prompts provided by the service through keypad input or by voice (where in such instances, voice recognition methodologies are employed to translate the user's voice responses into usable system inputs). Functional blocks 324, 326, and 328 in FIGS. 3A and 3B illustrate several additional options, voice annotation, song excerpt playback, and purchase options, respectively, that may be offered to the user in accordance with the invention. The purchase options, as noted above, provide a solution to the problem of music fans who attempt to purchase a particular song recording after hearing it being played or performed (for example, from a radio broadcast), but cannot recall the name of the song or artist. In accordance with this feature of the invention, the user may immediately purchase the desired recording via real-time purchase options block 328 immediately after receiving the voice report from voice annotation block 324.

Alternative options are also contemplated in accordance with the invention: the user may hear a clip of the identified recorded song (as compared to the playback of the captured signal described above); the user may hear more information about the song, artist, or album; the user may hear clips from other songs on the same album or from the same artist as the identified song; or, the customer may choose to interact with customer service personnel. Song database 360 is operationally coupled to identification reporting control 310 via line 362 to implement such contemplated options. Song database 360 may include songs as well as related or other data.

Data responses are used to transmit information about the identified signal back to the user through an interface such as a WAP browser interface on mobile telephones, or other appropriate protocols over time. In FIGS. 3A and 3B, the WAP browser interface block 340 is operationally coupled on line 338 to real-time reporting block 320. Thus, the user has the option to interact further with arrangement 100 (FIG. 1) by using such an interface in accordance with the principles of the invention. This particular interaction between user and service is characterized by being data prompted and does not need to rely upon voice.

However, a combination of voice and data is also contemplated as falling within the scope of the present invention as shown in FIGS. 3A and 3B, where such a combination creates a beneficial and seamless experience for the user. The technology platform in accordance with the invention advantageously integrates both voice and data (respectively through IVR and web-based operations, for example) so that the user's experience with a service utilizing the principles of the invention is consistent and seamless across all interfaces (including those identified in operational blocks 322, 340, and 350: interactive voice response interface, WAP browser interface, and internet browser interface, respectively).

Delayed reporting takes places at a point in time when the user has disconnected from the service, i.e., after the step of signal capture shown in signal capture block 105 (FIG. 1). Delayed reporting (or "offline" reporting), whether voice or data, is accomplished by sending information about the identified signal to the user via an Internet browser, email message, SMS message or other communication methodologies. This feature of the present invention is shown in FIGS. 3A and 3B with interface browser interface block 350, SMS text messaging block 360 and email information block 370 being operationally coupled to offline reporting block 330 on lines 332, 334, and 336, respectively. A combination of the three modes of offline reporting is possible and may be preferred in some applications of the invention.

Delayed reporting further may include the option for further interaction with a service which utilizes the principles of the present invention, such as playback, purchase opportunities, and the like. The blocks operationally coupled and depicted to the right of real-time reporting block 320 and offline reporting block 330 in FIGS. 3A and 3B thus represent data and/or signal outputs from reporting and transaction block 115 to users or other constituencies. More particularly, with respect to real-time reporting, interactive voice response user interface block 322 provides output data from voice annotation block 324, song excerpt playback block 326, and real-time purchase options block 328 back to the user (in this illustrative example of the invention via the return channel of the duplex call on the user's mobile telephone) as shown on line 372 of FIGS. 3A and 3B. Similarly, WAP browser interface block 340 and online information browsing options block 342 provide interactive data output to the user on line 374.

With respect to offline reporting, internet browser interface block 350 and online purchase options block 352 provide output on line 376 while SMS text messaging block 360 and email information block 370 provide output data, to the mobile telephone user in this illustrative example of the invention, via lines 378 and 380 in FIGS. 3A and 3B. Output from reporting and transaction block 115 is also directed to statistical data logger 130 (FIG. 1).

As with real-time purchase option block 328 in FIGS. 3A and 3B, WAP browser interface 340 and internet browser interface 350 are operationally coupled to online purchase options block 352 on lines 341 and 351, respectively. Online purchase options block 352 may implement the same type of functionalities and alternatives options discussed when describing real-time purchase options block 328 above. Similarly, online information browsing options block 342 is cross coupled to receive input from internet browser interface block 350 and WAP browser interface block 340 on lines 343 and 353, respectively.

A combination of real-time and offline reporting may be advantageously employed in some applications of the invention. In such combinations, the user distributes interactions with the service or particular aspects of interactions using both the real-time and offline interfaces over a period of time or at the same time. For example, a user may place an order for an identified song over the phone (the real-time interface), and then provide payment and delivery information for that order later through the service's website (the offline interface). Likewise, a user may wish to interact with the IVR in real-time over the phone while simultaneously interacting with the service to arrange for SMS message about a particular song to be sent to a friend's mobile phone. Of course, other beneficial combinations may be readily arranged using the principles of the present invention.

Online information browsing options block 342 may be used in certain applications of the invention to implement a number of desirable functionalities and features. For example, a user using a WAP or Internet browser could access a service provider's website which utilizes the features provided by online information browsing options block 342 in FIGS. 3A and 3B in accordance with the invention, to recommend songs to friends, chat with other service users, play games (e.g., a game where users try to identify obscure song tracks sampled by other users), and other activities that are facilitated by internet's large reach. In addition, information browsing options block 342 may be used to implement the delivery of promotional materials (such as clips from albums) and special event tickets or merchandise, or manage archived data selected by that user such as sample and "wish" lists. Information browsing options block 342 may also be used to implement an interaction with the user to manage or search for other information.

The present invention also includes features implemented using information-browsing options block 342 to allow users to set up alerts for news releases and concert announcements. Users could also interact with a service utilizing this feature of the invention to send information to friends (via SMS or email, for example) on the types of music they like, or send an audio clip directly to the friend's mobile telephone. A wide range of services and features, in fact, may be readily implemented using the data response features of the present invention.

While the present invention contemplates that reporting, both real-time and delayed, is primarily targeted to the user who requested identification, it may be desirable in some application of the inventions to include delayed reporting to other constituencies. This reporting occurs via a service utilizing the principles of the present invention and not directly from the user. For example, a person who identifies a song, can request the service to send an SMS or email message about the identification to other people as well.

Turning again to the present illustrative example of the invention where a user is located in a high noise environment such as an automobile, interactive voice response user interface block 322, in accordance with the invention, is utilized to minimize human intervention. First time users may interact with a human operator, in this illustrative example, using a mobile telephone, to register, for example, their email address, user profile, and other details relating to unregistered users who may wish to make purchases.

Communications may also be made with the user through email and website interactions. After the initial registration, a telephone interface enables users to dial a particular number to initiate a call to the service's IVR. The IVR identifies the caller through the user's mobile telephone number in accordance with operations of functional block 120 (FIG. 1). The user can then record a music sample, which in this example is being played on the user's car radio, which is captured and recognized (i.e., identified) as described above.

With the exception of the first time customer registration, calls will not require human intervention. The user may choose to receive a voice report relayed back on the mobile which provides the desired song identification from voice annotation block 324 (FIGS. 3A and 3B), or optionally, the user may receive an email with the name of the track, artist and album title, and links to the service provider's website which facilitates the user accessing a range of services as described above.

In another illustrative example of the invention, a user is listening to radio or television programming while working at a computer workstation. After an initial registration process similar to that described above (which may be accomplished over the telephone as with the previous example, or via online registration), the user may record a music sample using the computer's microphone and then access the service provider's facilities via website or dial up to allow the sample to be uploaded as a sound file, captured, and identified in accordance with the present invention. In this example, identification of the user may be effected through the user's IP address. Other features and functions in this example are similar in scope and operation to those described in the example above.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific communication techniques and protocols between various embodiments, any communication technique will suffice to transfer information between the two devices. Moreover, while some of the embodiments describe specific recording formats, any data and information format for transferring data to the user may be employed by the invention described herein. Furthermore, these examples should not be interpreted to limit the modifications and variations of the invention covered by the claims but are merely illustrative of possible variations.

APPENDIX 1

Abstract

We disclose a method and apparatus for recognizing sound, music, and other similar signals. The disclosed invention is capable of recognizing an exogenous sound signal that is a rendition of a known recording indexed in a database. The exogenous sound signal may be subjected to distortion and interference, including background noise, talking voices, compression artifacts, band-limited filtering, transmission dropouts, time warping, and other linear and nonlinear corruptions of the original signal. The algorithm is capable of identifying the corresponding original recording from a large database of recordings in time proportional to the logarithm of the number of entries in the database. Given sufficient computational power the system can perform the identification in nearly realtime, i.e. as the sound is being sampled, with a small lag.

Database Construction

The sound database may consist of any collection of recordings, such as speech, music, advertisements, or sonar signatures.

Indexing

In order to index the sound database, each recording in the library is subjected to landmarking and fingerprinting analysis to generate an index set for each item. Each recording in the database has a unique index, sound_ID.

Landmarking

Each sound recording is landmarked using methods to find distinctive and reproducible locations within the sound recording. The ideal landmarking algorithm will be able to mark the same points within a sound recording despite the presence of noise and other linear and nonlinear distortion. The landmarking method is conceptually independent of the fingerprinting process, but may be chosen to optimize performance of the latter. Landmarking results in a list of timepoints $\{landmark_k\}$ within the sound recording at which fingerprints should be calculated. A good landmarking scheme marks about 5-10 landmarks per second of sound recording, of course depending on the amount of activity within the sound recording.

Power Norms

A simple landmarking technique is to calculate the instantaneous power at every timepoint and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal.

Spectral Lp Norms

The power norm method of landmarking is especially good for finding transients in the sound signal. The power norm is actually a special case of the more general Spectral Lp Norm, where p=2. The general Spectral Lp Norm is calculated at each time along the sound signal by calculating the spectrum, for example via a Hanning-windowed Fast Fourier Transform (FFT). The Lp norm for that time slice is then calculated as the sum of the p-th power of the absolute values of the spectral components, optionally followed by taking the p-th root. As before, the landmarks are chosen as the local maxima of the resulting values over time.

Multislice Landmarks

Multi-slice landmarks may be calculated by taking the sum of p-th powers of absolute values of spectral components over multiple timeslices instead of a single slice. Finding the local maxima of this extended sum allows optimization of placement of the multislice fingerprints, described below.

Fingerprinting

The algorithm computes a fingerprint at each landmark timepoint in the recording. The fingerprint is generally a value or set of values that summarize a set of features in the recording near the timepoint. In our implementation the fingerprint is a single numerical value that is a hashed function of multiple features.

The following are a few possible fingerprint categories.

Salient Spectral Fingerprints

In the neighborhood of each landmark timepoint a frequency analysis is performed to extract the top several spectral peaks. A simple such fingerprint value is just the single frequency value of the strongest spectral peak. The use of such a simple peak resulted in surprisingly good recognition in the presence of noise, but resulted in many false positive matches due to the non-uniqueness of such a simple scheme. Using fingerprints consisting of the two or three strongest spectral peaks resulted in fewer false positives, but in some cases created a susceptibility to noise if the second-strongest spectral peak was not sufficiently strong enough to distinguish it from its competitors in the presence of noise—the calculated fingerprint value would not be sufficiently stable. Despite this, the performance of this case was also good.

Multislice Fingerprints

In order to take advantage of the time-evolution of many sounds a set of timeslices is determined by adding a set of offsets to a landmark timepoint. At each resulting timeslice a Salient Spectral Fingerprint is calculated. The resulting set of fingerprint information is then combined to form one multi-tone fingerprint. Each such fingerprint is much more unique than the single-time salient spectral fingerprint since it tracks temporal evolution, resulting in fewer false matches. Our experiments indicate that using two or three timeslices along with the single strongest spectral peak in each timeslice results in very good performance, even in the presence of significant noise.

LPC Coefficients

In addition to finding the strongest spectral components, there are other spectral features that can be extracted and used as fingerprints. LPC analysis extracts the linearly predictable features of a signal, such as spectral peaks, as well as spectral shape. LPC coefficients of waveform slices anchored at landmark positions can be used as fingerprints by hashing the quantized LPC coefficients into an index value. LPC is well-known in the art of digital signal processing.

Cepstral Coefficients

Cepstral coefficents are useful as a measure of periodicity and may beused to characterize signals that are harmonic, such as voices or many musical instruments. A number of cepstral coefficients may hashed together into an indes and used as a fingerprint. Cepstral analysis is well-known in the art of digital signal processing.

Index Set

The resulting index set for a given sound recording is a list of pairs (fingerprint, landmark) of analyzed values. Since the index set is composed simply of pairs of values, it is possible to use multiple landmarking and fingerprinting schemes simultaneously. For example, one landmarking/fingerprinting scheme may be good at detecting unique tonal patterns, but poor at identifying percussion, whereas a different algorithm may have the opposite attributes. Use of multiple landmarking/fingerprinting strategies results in a more robust and richer range of recognition performance. Different fingerprinting techniques may be used together by reserving certain ranges of fingerprint values for certain kinds of fingerprints. For example, in a 32-bit fingerprint value, the first 3 bits may be used to specify which of 8 fingerprinting schemes the following 29 bits are encoding.

Searchable Database

Once the index sets have been processed for each sound recording in the database, a searchable database is constructed in such a way as to allow fast (log-time) searching. This is accomplished by constructing a list of triplets (fingerprint, landmark, sound_ID), obtained by appending the corresponding sound_ID to each doublet from each index set. All such triplets for all sound recordings are collected into a large index list. In order to optimze the search process, the list of triplets is then sorted according to the fingerprint. Fast sorting algorithms are well-known in the art and extensively discussed in D. E. Knuth, "The Art of Computer Programming, Volume 3: Sorting and Searching," hereby incorporated by reference. High-performance sorting algorithms can sort the list in N log(N) time, where N is the number of entries in the list. Once this list is sorted it is further processed by segmenting it such that each unique fingerprint in the list is collected into a new master index list. Each entry in this master index list contains a fingerprint value and a pointer to a list of (landmark, sound_ID) pairs. Rearranging the index list in this way is optional, but saves memory since each fingerprint value only appears once. It also speeds up the database search since the effective number of entries in the list is greatly reduced to a list of unique values.

Alternatively, the master index list could also be constructed by inserting each triplet into a B-tree with non-unique fingerprints hanging off a linked list. Other possibilites exist for constructing the master index list. The master index list is preferably held in system memory, such as DRAM, for fast access.

Recognition System

Once the master index list has been built it is possible to perform sound recognition over the database.

Sound Source

Exogenous sound is provided from any number of analog or digital sources, such as a stereo system, television, Compact Disc player, radio broadcast, telephone, mobile phone, internet stream, or computer file. The sounds may be realtime or offline. They may be from any kind of environment, such as a disco, pub, submarine, answering machine, sound file, stereo, radio broadcast, or tape recorder. Noise may be present in the sound signal, for example in the form of background noise, talking voices, etc.

Input to the Recognition System

The sound stream is then captured into the recognition system either in realtime or presented offline, as with a sound file. Realtime sounds may be sampled digitally and sent to the system by a sampling device such as a microphone, or be stored in a storage device such as an answering machine, computer file, tape recorder, telephone, mobile phone, radio, etc. The sound signal may be subjected to further degradation due to limitations of the channel or sound capture device. Sounds may also be sent to the recognition system via an internet stream, FTP, or as a file attachment to email.

Preprocessing

Once the sound signal has been converted into digital form it is processed for recognition. As with the construction of the master index list, landmarks and fingerprints are calculated. In fact, it is advisable to use the very same code that was used for processing the sound recording library to do the landmarking and fingerprinting of the exogenous sound input. The resulting index set for exogenous sound sample is also a list of pairs (fingerprint,landmark) of analyzed values.

Searching

Searching is carried out as follows: each fingerprint/landmark pair (fingerprint$_k$,landmark$_k$) in the resulting input sound's index set is processed by searching for fingerprintk in the master index list. Fast searching algorithms on an ordered list are well-known in the art and extensively discussed in Knuth, Volume 3 (ibid), incorporated by reference. If fingerprint$_k$ is found then the corresponding list of matching (landmark*$_j$, sound_ID$_j$) pairs having the same fingerprint is copied and augmented with landmarkk to form a set of triplets of the form (landmark$_k$, landmark*$_j$,sound_ID$_j$). This process is repeated for all k ranging over the input sound's index set, with the all the resulting triplets being collected into a large candidate list.

After the candidate list is compiled it is further processed by segmenting according to sound_ID. A convenient way of doing this is to sort the candidate list according to sound_ID, or by insertion into a B-tree. The result of this is a list of candidate sound_IDs, each of which having a scatter list of pairs of landmark timepoints, (landmark$_k$,landmark*$_j$) with the sound_ID stripped off.

Scanning

The scatter list for each sound_ID is analyzed to determine whether it is a likely match.

Thresholding

One way to eliminate a large number of candidates is to toss out those having a small scatter list. Clearly, those having only 1 entry in their scatter lists cannot be matched.

Alignment

A key insight into the matching process is that the time evolution in matching sounds must follow a linear correspondence, assuming that the timebases on both sides are steady. This is almost always true unless the sound on one side has been nonlinearly warped intentionally or subject to defective playback equipment such as a tape deck with a warbling speed problem. Thus, the matching fingerprints yielding correct landmark pairs (landmark$_n$,landmark*$_n$) in the scatter list of a given sound_ID must have a linear correspondence of the form $$\text{landmark*}_n = m * \text{landmark}_n + \text{offset}$$

where m is the slope, and should be near 1, landmark$_n$ is the corresponding timepoint within the exogenous sound signal, landmark*$_n$ is the corresponding timepoint within the library sound recording indexed by sound_ID, and offset is the time offset into the library sound recording corresponding to the beginning of the exogenous sound signal.

This relationship ties together the true landmark/fingerprint correspondences between the exogenous sound signal and the correct library sound recording with high probability, and excludes outlier landmark pairs. Thus, the problem of determining whether there is a match is reduced to finding a diagonal line with slope near 1 within the scatterplot of the points in the scatter list.

There are many ways of finding the diagonal line. A preferred method starts by subtracting m*landmark$_n$ from both sides of the above equation.

$$(\text{landmark*}_n - m * \text{landmark}_n) = \text{offset}$$

Assuming that m is approximately 1, we arrive at $$(\text{landmark*}_n - \text{landmark}_n) = \text{offset}$$

The diagonal-finding problem is then reduced to finding multiple landmark pairs that cluster near the same offset value. This is accomplished easily by calculating a histogram of the resulting offset values and searching for the offset bin with the highest number of points. Since the offset must be positive if the exogenous sound signal is fully contained within the correct library sound recording, landmark pairs that result in a negative offset are excluded.

The winning offset bin of the histogram is noted for each qualifying sound_ID, and the corresponding score is the number of points in the winning bin. The sound recording in the candidate list with the highest score is chosen as the winner. The winning sound_ID is provided to an output means to signal the success of the identification.

To prevent false identification, a minimum threshold score may be used to gate the success of the identification process. If no library sound recording meets the minimum threshold then there is no identification.

Pipelined Recognition

In a realtime system the sound is provided to the recognition system incrementally over time. In this case it is possible to process the data in chunks and to update the index set incrementally. Each update period the newly augmented index set is used as above to retrieve candidate library sound recordings using the searching and scanning steps above. The advantage of this approach is that if sufficient data has been collected to identify the sound recording unambiguously then the data acquisition may be terminated and the result may be announced.

Reporting the Result

Once the correct sound has been identified, the result is reported. Among the result-reporting means, this may be done using a computer printout, email, SMS text messaging to a mobile phone, computer-generated voice annotation over a telephone, posting of the result to an internet account which the user can access later.

What is claimed is:

1. A method for identifying recorded sound signals comprising:

receiving a sound stream including an unidentified recorded sound;

processing the received sound stream to determine an index set of values corresponding to characteristics of the unidentified recorded sound, wherein the index set of values comprises fingerprint and landmark pairs, wherein the landmark indicates a distinctive and reproducible location for determining the fingerprint for the unidentified recorded sound;

searching a library using fingerprints of the fingerprint and landmark pairs, the library having sets of values corresponding to characteristics of a plurality of library recorded sounds, wherein each of the sets of values in the library comprises fingerprint and landmark pairs, wherein the landmark indicates a distinctive and reproducible location for determining the fingerprint for each of the library recorded sounds;

identifying, via a processor, one or more landmarks in the library corresponding to fingerprints in the library that match any of the fingerprints of the index set of values; and determining a library recorded sound matching the unidentified recorded sound based on an amount of the one or more landmarks in the library recorded sound having a matching time difference between landmarks of matching fingerprints of the index set of values.

2. The method according to claim 1, further including returning information relating to the library recorded sound to a client device.

3. The method according to claim 2, wherein the information is returned over a first delivery channel, the first delivery channel including an interface selected from the group consisting of a real-time reporting interface and an offline reporting interface.

4. The method according to claim 3, wherein the real-time reporting interface is an interactive voice response interface.

5. The method according to claim 3, wherein the information is provided to the client device as a voice report.

6. The method according to claim 3, wherein the real-time reporting interface is a WAP browser interface.

7. The method according to claim 3, wherein the offline reporting interface is an internet browser interface.

8. The method according to claim 1, wherein the unidentified recorded sound is provided to a client device over a transmission medium.

9. The method according to claim 8, wherein the transmission medium includes acoustic waves.

10. The method according to claim 8, wherein the transmission medium includes radio waves.

11. The method according to claim 9, wherein the transmission medium includes digital audio streams.

12. The method according to claim 8, wherein the transmission medium includes PCM streams.

13. The method according to claim 8, wherein the transmission medium includes internet streaming broadcasts.

14. The method according to claim 8, wherein the transmission medium includes a digital audio stream, and wherein the digital audio stream is compressed.

15. The method according to claim 14, wherein the compressed digital audio stream is a Dolby Digital or MP3 audio stream.

16. The method according to claim 1, wherein the sound stream is received over a delivery channel selected from the group consisting of POTS lines, wireless cellular, wireless PCM, GSM, internet, radio, satellite, and a network.

17. The method according to claim 16, wherein the network includes a local area network.

18. The method according to claim 16, wherein the network includes an Ethernet network.

19. The method according to claim 16, wherein the network includes one or more private networks.

20. The method according to claim 16, wherein the network includes a cable network.

21. The method according to claim 16, wherein the network is configured to operate according to a short-range wireless protocol.

22. The method according to claim 21, wherein short-range wireless protocol includes the Bluetooth wireless standard.

23. The method according to claim 1, wherein receiving the sound stream comprises receiving the sound stream from a capture device.

24. The method according to claim 23, wherein the capture device includes a telephone.

25. The method according to claim 23, wherein the capture device includes a mobile telephone.

26. The method according to claim 23, wherein the capture device includes a tape recorder.

27. The method according to claim 23, wherein the capture device includes a digital voice recorder.

28. The method according to claim 23, wherein the capture device includes an answering machine.

29. The method according to claim 23, wherein the capture device includes a radio receiver.

30. The method according to claim 23, wherein the capture device includes a walkie-talkie.

31. The method according to claim 23, wherein the capture device includes an internet streaming socket.

32. The method according to claim 23, wherein the capture device includes a voice-over-IP transceivers.

33. The method according to claim 1, further comprising determining a score associated with the temporal correspondence.

34. A method for detecting use of copyrighted audio media, the method comprising:
receiving a signal including a captured sample of an audio signal;
deriving from the signal a characteristic of the captured sample, wherein the characteristic comprises a fingerprint and a landmark indicating a distinctive and reproducible location for determining the fingerprint for the captured sample;
comparing, via a processor, the characteristic of the captured sample to a characteristic associated with a stored identity record of copyrighted audio media included in a database, wherein the characteristic associated with the stored identity record of copyrighted audio media comprises a fingerprint and a landmark indicating a distinctive and reproducible location for determining the fingerprint for the copyrighted audio media; and
determining a probability of a match between the audio signal and a stored identity record based on an amount of characteristics of the captured sample having a matching time difference between characteristics associated with the stored identity record of the copyrighted audio media, wherein the captured sample of the audio signal is captured at a location remote from the database.

* * * * *